Aug. 6, 1940.  P. POTOCEK  2,210,256
COMBINED STRAINER AND COOLER
Filed Aug. 27, 1937
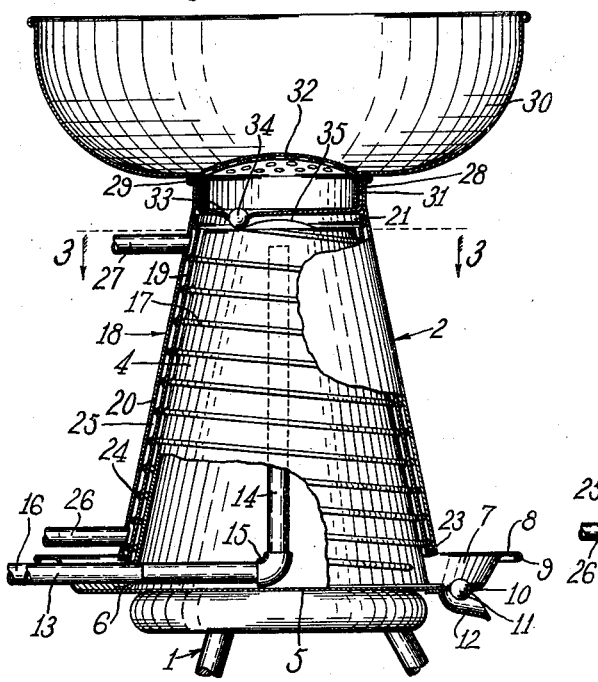
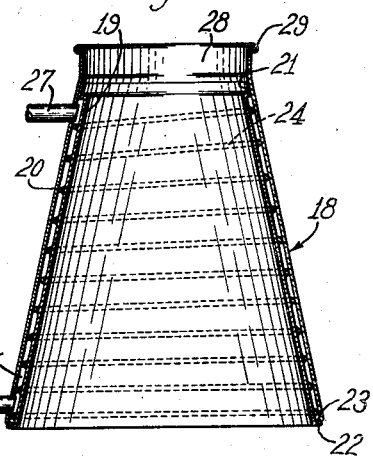
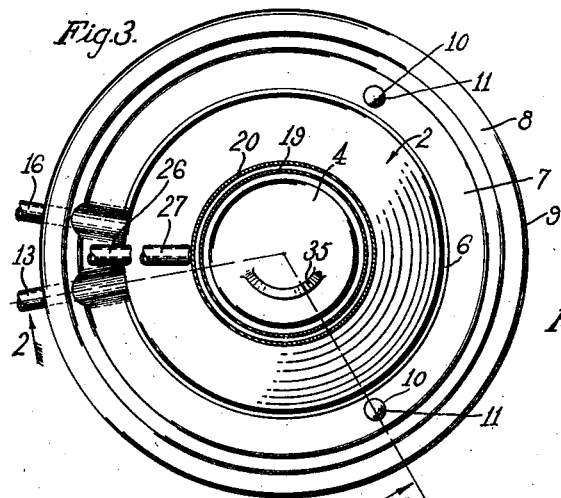
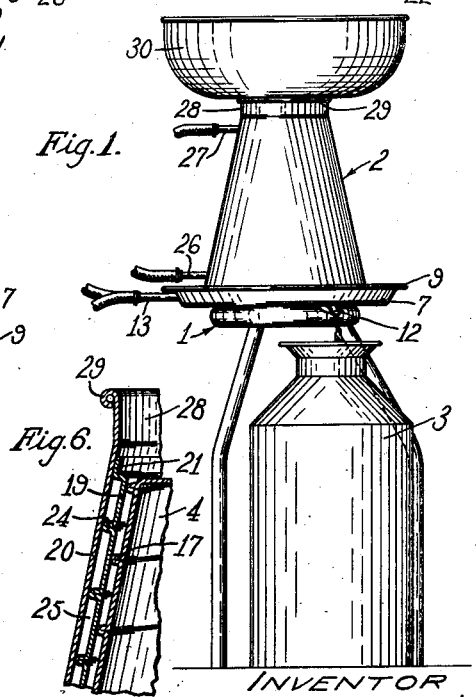
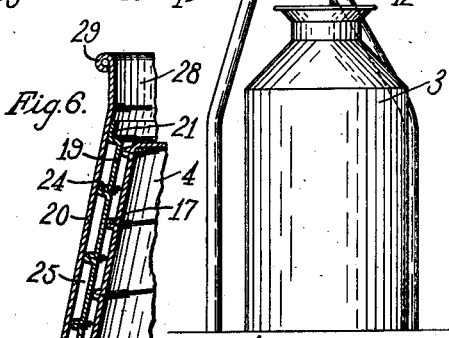
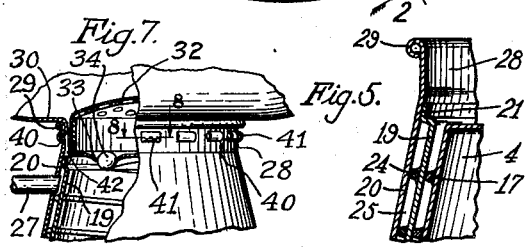
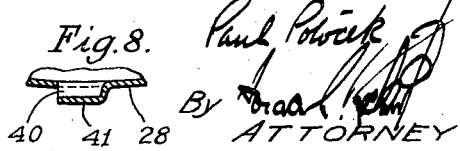
INVENTOR
Paul Potocek
By ATTORNEY Patented Aug. 6, 1940

2,210,256

UNITED STATES PATENT OFFICE 2,210,256

COMBINED STRAINER AND COOLER

Paul Potocek, Hebron, Conn.

Application August 27, 1937, Serial No. 161,269

9 Claims. (Cl. 210—150.5)

My invention relates to combined strainers and coolers.

It has among its objects to provide an improved cooling device of comparatively small size and high cooling efficiency, which is especially adapted for use on dairy farms. A further object of my invention is to provide such a device in which the milk or liquid is cooled with a minimum of equipment and at a maximum rate of speed. A still further object is to provide an improved cooling device of a size comparable with that of coolers now in similar use, wherein greater cooling is effected within substantially the same amount of space. Yet another object is to provide a cooling structure in which the rate of cooling and the rate of feeding the liquid to be cooled may be easily regulateed by improved means. Other objects include the provision of an improved cooling device wherein the constituent parts are adapted to be readily cleaned and to be assembled in a manner which enables them to be easily taken apart for cleaning or repair. These objects and others, together with the advantages of my improved construction, will hereinafter more fully appear.

In the accompanying drawing I have shown, for purposes of illustration, a preferred embodiment of my invention and an alternative form of construction which may be employed in practice.

In this drawing—

Fig. 1 is an elevational view, showing the assembly of my improved cooling device;

Fig. 2 is a sectional elevation on the line 2—2 of Fig. 3 with the outer and inner shells shown in part, and in part broken away to disclose the internal structure of the device;

Fig. 3 is a sectional plan view on the line 3—3 of Fig. 2, showing the valve operating cam surface on the inner vessel;

Fig. 4 is a sectional elevation of the outer double walled jacket;

Fig. 5 is an enlarged partial section, showing in detail a preferred form of ribbed surface on the jacket and on the inner vessel;

Fig. 6 is a similar section of an alternative form of ribbed surface;

Fig. 7 is a detail view, partly in section, of the upper part of the cooling device, showing holes opening to the exterior of the outer shell; and Fig. 8 is an enlarged view on the line 8—8 of Fig. 7.

Reference is first made to Fig. 1, in which there is shown a tripod or supporting stand, 1, carrying on the top thereof an improved cooling device generally indicated at 2 and having provision for cooling milk poured into an enlarged top or funnel on the device and allowed to flow to a trough at the bottom thereof. It is desirable to employ a tripod 1 of sufficient height to permit one or more milk cans 3, of standard size, to be moved under the trough of the cooling device 2, while the top of the tripod is of a convenient size to allow the trough to overhang its edges and to permit the milk or other liquid to flow readily from the trough into the milk cans 3.

Reference is next made to Fig. 2, in which my improved cooling device is shown to comprise an inner vessel 4, preferably adapted to include a base 5, the shell forming the vessel 4 being flanged, as at 6, and tightly secured in a leak proof manner to the base 5. In order to form means by which the milk, or other fluid, may be directed into the milk can 3, an extension is provided on the base 5 and is shaped or bent upwardly to constitute an annular trough 7. The edge of the annular trough 7 is flattened outwardly over a relatively short area 8 and bent or curled under, as at 9, so as to establish means for lifting the entire device 2, from the tripod 1. Within the bottom of the trough 7 there are provided openings, or holes, 10, herein two in number, and associated plugs or ball shaped valves 11 which serve to close off the openings, or to allow liquid in the trough to flow through any desired opening under which the milk can is placed. The holes 10 may be so spaced that two of more milk cans may be positioned under the cooling device, the additional can or cans being held in readiness while milk is flowing into a can under the opening, in which the cooperating valve 11 has been raised. A downwardly extending shaped lip 12 may be secured on the underside of the base 5 under each opening 10, so as to insure a flow or stream of liquid which will not tend to spray or be directed away from the mouth of the can 3.

The interior of the inner vessel 4 is supplied with a cooling fluid, or liquid, through a pipe 13, conveniently located in an opening at the bottom of the vessel and extending only a short distance into the interior thereof. Cooling fluid, such as water, which is supplied through the pipe 13, absorbs heat as it rises within the vessel, and the relatively warm fluid is drawn off from the top by an upstanding pipe or tube 14 provided with a suitable elbow connection 15 and outlet means 16, passing through an opening adjacent the inlet opening 13 at the bottom of the vessel. It will be appreciated that pipes 13 and 16 are secured within the openings in a leak proof manner, so that the cooling liquid, passing inward through the pipe 13, has no means of escape from the interior of the vessel save through the upstanding tube 14 and the outlet pipe 16.

The outer surface of the vessel 4 is herein provided with ribs, or projections, 17 preferably disposed in a helical manner and forming a continuous path by which liquid to be cooled flows downward over the external face of the vessel into the trough 7 at the bottom. Because of the desirability of promoting a relatively rapid rate of flow of the liquid to be cooled and of holding the liquid against the external surface, the inner vessel 4 is shaped in the form of a truncated cone with a relatively steep side wall. It is preferred to space the ribs 17 progressively more closely together toward the bottom of the vessel 4, so as to slow the rate of flow of the milk over the greater cooling area presented by the enlarged lower portion of the vessel and to obtain a maximum of cooling from the entire surface of the vessel.

In accordance with my invention, I have devised an improved and novel external water cooled jacket member 18, which is adapted to cooperate with the inner vessel above described and to be slipped longitudinally over the latter from the top and to fit snugly against the ribs 17 in such manner as to be wholly supported thereby, the conical shape of the cooperating members insuring that these cooperating members will fit snugly even after the parts have become worn. The jacket member 18 comprises an inner jacket, or wall, 19, and an outer jacket, or wall, 20, the inner jacket being provided with an annular expanded offset 21 at the top thereof, which is connectible with the inner face of the outer jacket 20. At the bottom, both the inner jacket 19 and the outer jacket 20 have suitable flanges 22, 23, fitting one within the other and of a width equivalent to that of the offset 21. It is to be noted that the jacket member 18 does not extend to the bottom of the inner vessel. It is apparent that as the ribs become worn from repeated use, this difference in length permits the cooperating parts to adjust themselves as they become worn. On the outer wall of the inner jacket 19, I prefer to employ helical ribs or projections 24 which, when the jacket member 18 is placed over the vessel 4, assume an outer position conforming to the position of the ribs 17 on the vessel 4. The ribs 24 are preferably of sufficient width to make contact with the adjoining wall of the outer member 20 and are substantially of the same width as that of the offset 21 and of the flanges 22 and 23. The inner and outer jackets 19, 20 are fitted together and tightly secured, as by welding, or other suitable means, along the peripheries of the flanges 22 and 23 and of the offset 21, forming a unitary structure which is readily movable into or out of position over the inner vessel 4. It will be understood that the ribs 24, since they make contact with the inner wall of the outer jacket, form a winding chamber 25 extending from the top of the jacket member 18 to the bottom thereof. The bottom of the chamber 25 is entered by a tightly fitted inlet pipe 26 through an opening in the outer shell, and the upper part of the chamber has an opening through which an outlet pipe 27 extends, the pipe 27 also being tightly secured in the opening.

By the use of the above described construction, it is apparent that a simple relatively inexpensive structure is produced which is easy to clean and which may be taken apart and reassembled with a minimum loss of time. The parts are conically shaped to insure that there will be a tight or snug fit between the ribs 17 and the cooperating surface of the jacket member 18 at all times regardless of the wear of the parts.

At the upper end of the jacket member 18 I prefer to form a straight walled section 28, having the upper end beaded or turned over, as at 29. Into the extension 28, formed at the top of the jacket member 18, is inserted an enlarged hopper or funnel member 30 which has an annular depending portion 31 adapted to fit within the extension 28 and to be rotated within the same. The upper area of the depending portion 31 of the funnel member 30 may be covered by a usual removable strainer 32 to filter the milk or other liquid to be cooled. In further accordance with my invention, the bottom surface of the depending portion 31 of the funnel member 30 is provided with an opening 33, within which a ball member 34 is adapted to seat and to act as a valve for regulating the flow of liquid to be cooled. The ball member 34 is raisable in the opening 33 by action of the ball member against a cam surface 35, which may be disposed on the top of the inner vessel 4. By rotating the funnel member 30, the ball member 34 is raised upwardly on the inclined cam surface 35 to produce the desired rate of flow of the liquid to be cooled through the opening 33.

It will be understood that, when milk or other fluid is poured into the funnel member 30, it passes through the strainer 32 and through the opening 33, the valve 34 being open, into the space between the inner vessel and the outer jacket member 18. The milk then flows downwardly while being cooled, along the helical path formed by the raised ribs 17 to the trough 7, being at the desired temperature when reaching the trough. Then the milk is allowed to flow, by removal of a plug 11, through one or more of the openings 10 in the bottom of the trough, over one or more of the lips, or spouts, 12 into the desired milk can 3. The milk is cooled as it flows down over the outer surface of the inner vessel 4 by cold water or other cooling fluid which passes in through the inlet pipe 13 and which rises to the top of the interior of the vessel, cooling the shell of the vessel as it does so. From the top of the vessel the cooling fluid, which has absorbed heat from the downwardly flowing milk on the outside of the shell, is drawn off through the upstanding tube 14 and outlet 16. As will also be understood, the jacket member 18 acts as a shield to protect the liquid to be cooled as it flows over the surface of the inner vessel, and herein also acts to supplement the internal cooling by supplying an additional cooling effect to the exterior of the vessel 4. To accomplish the increased cooling, water or other cooling fluid is supplied through the inlet 26 to the chamber 25 between the inner jacket 19 and the outer jacket 20. Through the chamber 25 the cooling fluid flows upwardly, contrary to the direction of flow of the liquid to be cooled, and is drawn off through the outlet 27 after absorbing heat from the liquid to be cooled.

It will be appreciated that with milk, or other liquid to be cooled, flowing downwardly over the surface of the inner vessel in a relatively thin stream which is subjected to both internal and external cooling, a maximum cooling effect will be obtained with a device relatively small in size. The rate of cooling may be easily changed or regulated for any given set of pressure conditions and rates of flow of the cooling water or fluid, by a slight rotation of the funnel member 30, which raises or lowers the ball member 34 and adjusts the opening 33 to accomplish the desired rate and degree of cooling.

In Fig. 5 there is shown a preferred form of construction of the ribs 17 and 24. In this form, ribs are fastened securely to the inner vessel 4 and the inner jacket 19 as by soldering or welding, or by any other suitable method of joining the ribs to the walls of the vessel and jacket. The alternative form of construction in Fig. 6, shows ribs provided on the outer surfaces of the vessel and the inner jacket by compressing or otherwise forming the walls of these members in the process of manufacture. Either of these methods of forming the ribs may be successfully employed, but it is desirable to use the one which leads to the most economical construction, while giving the most satisfactory result.

Fig. 7 shows a modification of the straight walled section 28, in which holes 40 are provided at spaced intervals around the top of the periphery of the section to permit any excess milk to flow out over the exposed surface of the outer jacket 20 and downwardly to the trough after passing through the valved opening 33. It is desirable to form the holes 40 so that the liquid to be cooled will not flow directly downward from the same, but so that it will tend to flow circumferentially in a longer path over the exposed surface of the jacket 20, and for these reasons the walls 41 of the holes 40 are made in the shape of circumferential discharge outlets, having the metal of the jacket bent slightly to guide the flow of milk circumferentially. Note here also that in this construction the wall of the hopper is spaced from the section 28 as shown at 42 in such manner that the excess milk may pass freely to the holes 40. Provision of the holes 40 allows a greater volume of milk to be passed through the device for cooling and also permits the outer wall of the outer jacket to be made use of in cooling the milk.

While I have in this application specifically described certain forms which my invention may assume in practice, it will be understood that the same are chosen for purposes of illustration and that the structure may be modified and embodied in other forms without departing from its spirit or the scope of the appended claims.

What I claim as new and desire to secure by Letters Patent is:

1. In a liquid cooling device, a cooling unit comprising cooling means including a vessel for circulating an inner cooling medium, means on the outer surface of said vessel for directing the flow of liquid to be cooled, and wall jacketing means supported by said vessel above the lower end thereof and laterally enclosing said vessel and providing passage means for an outer cooling medium.

2. In a liquid cooling device, a cooling unit including an inner closed vessel of conical form having means for circulating an inner cooling medium, raised helical means on the outer surface of said vessel for directing the flow of liquid to be cooled, and outer vertically removable wall jacketing means enclosing and vertically supported by the edge of said raised helical means above the lower end of said vessel and providing passage means for an outer cooling medium.

3. In a liquid cooling device, a cooling unit comprising cooling means including a vessel having inlet and outlet means for circulating a cooling fluid, means on the outer surface of said vessel forming a helical path of gradually decreasing pitch for liquid to be cooled, and wall jacketing means laterally enclosing said vessel and enclosing said path forming means, said last mentioned means providing means for the passage of a cooling fluid substantially conforming to the path of the liquid to be cooled.

4. In a liquid cooling device, a cooling unit comprising a vessel of truncated conical form having means for internally circulating a cooling fluid, outer jacket members superimposed on one another and enclosing the substantially vertical walls of said vessel, means on the substantially vertical walls of said vessel for directing the flow of a liquid to be cooled, and the outer of said members having means for directing the flow of cooling fluid, said jacket members being of less length than said vessel to insure that the jacket members will fit snugly over said flow directing means to support said members.

5. In a liquid cooling device, a cooling unit comprising cooling means including a vessel having means for circulating a cooling liquid, means on the surface of said vessel for directing the flow of liquid to be cooled, and wall enclosing means for said vessel having a chamber for the passage of additional cooling liquid, said cooling unit also comprising liquid receptacle means having a valve in an opening communicating with said flow directing means, said vessel having cam means regulating said valve when said receptacle means are moved relative to said vessel.

6. In a liquid straining and cooling device, a cooling unit comprising cooling means including a vessel having means for circulating a cooling liquid, means on the surface of said vessel for directing the flow of liquid to be cooled, and wall enclosing means for said vessel having a chamber for the passage of additional cooling liquid, said cooling unit also comprising liquid funneling means rotatably mounted on said vessel and having a strainer and a valve controlling an opening communicating with said flow directing means, and cam means connected with said vessel whereby said valve is adjusted when the funneling means are rotated.

7. In a liquid cooling device, a cooling unit comprising a vessel having means for circulating cooling liquid, inner and outer jacket members enclosing the lateral walls of said vessel, means including helically disposed ribs between the surface of said vessel and the inner jacket and providing chambers for the flow of liquid to be cooled, said jacket members being supported by the lateral walls of said vessel and having lower end portions spaced above the lower end of said vessel and means including similarly disposed ribs between jackets providing chambers for the flow of additional cooling liquid in substantial conformity and adjacent relation to the flow of liquid to be cooled.

8. In a liquid cooling device, a cooling unit comprising a vessel having means for internally circulating a cooling liquid, and outer jacket members laterally enclosing the same, means on said vessel for directing the flow of a liquid to be cooled and for supporting the outer jacket members above the lower portion of said vessel, said outer jacket members being removable longitudinally from said vessel.

9. In a liquid cooling device, a cooling unit comprising an inner closed vessel of conical form having an unobstructed interior for the circulation of an inner cooling fluid and having means for circulating a cooling fluid therein including a bottom inlet pipe and a bottom outlet pipe, said outlet pipe extending upwardly in the interior of said vessel and terminating adjacent the top of said vessel, outer jacket members laterally enclosing said vessel and providing passage means including an inlet and an outlet for an outer cooling medium, means on the outer conical wall of said vessel for directing the flow of a liquid to be cooled and for supporting the outer jacket members above said bottom inlet and outlet pipes, said outer jacket members being removable longitudinally from said vessel.

PAUL POTOCEK.